Figure 1:
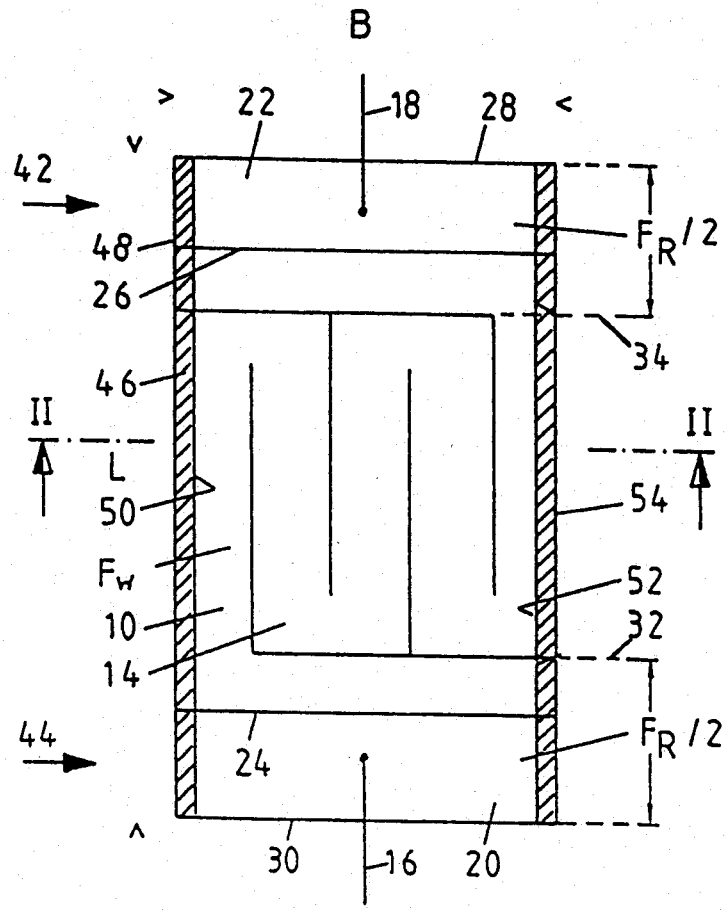

United States Patent [19]

Huck et al.

[11] Patent Number: 5,251,481
[45] Date of Patent: Oct. 12, 1993

[54] DIRECT-INTAKE AIR MEASURING APPARATUS

[75] Inventors: Ralf Huck, Hanau; Eckert, Gründau, both of Fed. Rep. of Germany

[73] Assignee: Sensycon, Fed. Rep. of Germany

[21] Appl. No.: 719,370

[22] Filed: Jun. 24, 1991

[30] Foreign Application Priority Data

Jun. 22, 1990 [DE] Fed. Rep. of Germany ... 9006967[U]

[51] Int. Cl.$^5$ .............................................. G01F 1/68
[52] U.S. Cl. .................................. 73/204.26; 73/118.2
[58] Field of Search ............. 73/204.25, 204.26, 118.2

[56] References Cited

U.S. PATENT DOCUMENTS

| | | | |
|---|---|---|---|
| 4,449,402 | 5/1984 | Eiermavr et al. | 73/204.26 |
| 4,608,865 | 9/1986 | Muller et al. | 73/204.23 |
| 4,635,475 | 1/1987 | Jones et al. | |
| 4,761,995 | 8/1988 | Ohta et al. | |
| 4,777,820 | 10/1988 | Hecht et al. | |
| 4,825,694 | 5/1989 | Weibler | 73/204.26 |
| 4,829,814 | 5/1989 | Suzuki et al. | 73/204.26 |
| 4,833,912 | 5/1989 | Ohta et al. | 73/204.26 |
| 4,843,882 | 7/1989 | Ohta et al. | |
| 4,936,145 | 6/1990 | Hohenstatt | 73/204.26 |
| 5,038,610 | 8/1991 | Diehl et al. | 73/204.26 |

FOREIGN PATENT DOCUMENTS 2177212 5/1986 United Kingdom .

Primary Examiner—Michael T. Razavi
Assistant Examiner—R. Biegel
Attorney, Agent, or Firm—Cushman, Darby & Cushman

[57] ABSTRACT

An anemometer having a substrate onto which a temperature-dependent surface resistor is deposited. The active surface of the surface resistor is spaced from the leading edge of the substrate. A covering layer extends over the surface resistor and extends to the substrate at least in the area of the active surface.

8 Claims, 1 Drawing Sheet

DIRECT-INTAKE AIR MEASURING APPARATUS

The invention relates to an anemometer for measurement of the flow speed or mass flow of gases or fluids with a block-shaped substrate preferably consisting of glass material and having a leading edge and onto which a temperature-dependent surface resistor is deposited on which a cover layer is disposed in its turn, the surface resistor comprising an active surface with preferably meander-shaped current path and at least one adjacent edge area on the holding device side from which extend electrical supply and discharge leads.

To achieve an optimum combustion process in internal combustion engines in particular, precise information on the aspirated air quantity must be available. Based on this, the ignition point, the fuel quantity to be injected and similar can be regulated.

To measure the flow speed and mass flow of gases and fluids, anemometers are used that are well known as regards their design. As a general principle, these have two temperature-dependent electrical resistors with at least one temperature-independent electrical resistor, that are connected to form a bridge circuit. One of the temperature-dependent electrical resistors is electrically heated and subjected to the flow of the fluid to be measured. With the other temperature-dependent resistor, the temperature of the fluid itself is measured. An electrical regulating circuit ensures that the heated electrical resistor is kept at a constant differential temperature relative to the temperature of the fluid. A nemometers are known from German patents DE-B 26 49 040 or DE-C 31 27 981, for example. The plate-like substrates comprising electrically insulating material as carriers for the surface resistor have their largest faces aligned parallel to the flow direction of the gases or fluids, with surface resistors vapour-deposited, for example, on preferably only one but if necessary on both of the two largest surfaces. Contact surfaces and current paths are are then separated from one another by partitioning cuts, the latter running in a meander shape with their main direction vertical to the flow direction. The contact surfaces connected by the electrical leads are in the edge areas in which the substrate is mounted in a holding means.

One of the aims of the present invention is to solve the problem of developing a resistor element intended in particular for an anemometer of the type mentioned at the outset such that the surface resistor remains unchanged in its active surface, i.e. in that area in which the preferably meander-shaped current path is provided, regardless of the application and even after a long operating period. In particular, the possibility should be ruled out of dirt or moisture, for example, getting into the area of the active surface. In addition, the problem of temperature adjustment when the flow speed or mass flow changes must be resolved to the effect that a stable temperature state of the temperature-dependent surface resistor is attained almost inertia-free.

The problem is solved in accordance with the invention substantially in that at least the active surface of the surface resistor runs at a distance from the leading edge at least of the substrate and in that the cover layer extends to the substrate at least in the area of the active surface. The surface resistor is preferably at a distance both from the leading edge and from the edge opposite thereto at least in the area of its active surface, with the cover layer extending to the substrate.

The measures in accordance with the invention therefore ensure that the cover layer completely covers the surface resistor at least in the area of its active surface, i.e. the area in which signals are generated that permit conclusions to be drawn about the flow speed or mass flow of gases and fluids and about the temperature of the latter, with the result that in this area it is not possible either for dirt particles to accumulate or for moisture in particular to penetrate, which would cause an alteration in the surface resistor in its active surface which in its turn would lead to falsification of the signals acquired.

Although it is sufficient as a general principle for the surface resistor to be at a distance from the leading edge or from the opposite edge in the area of its active surface, it is provided for reasons of simplification of manufacture that the entire surface resistor is at a distance from the leading edge of the substrate and also preferably from the edge of the substrate opposite the leading edge, with the cover layer then obviously extending to the substrate surface itself.

In accordance with a further noteworthy independent proposal, the cover layer itself consists of two layers, of which the (first) layer oriented towards the surface resistor or substrate has a melting point lower than that of the substrate. The first layer can here preferably have lead oxide as a substantial component. The first layer can be deposited by screen printing, for example, and then fired.

The second layer, i.e. the outer layer, can for its part be of silicon oxide and be applied by vapour deposition, for example, onto the first layer.

The first layer can have a thickness of around 10 $\mu$m ±4 $\mu$m, and the second a thickness of around 2 $\mu$m ±1 $\mu$m.

The following advantages are obtainable thanks to this layer structure. The first layer, applicable using thick-film technology, effects a "straightening" of the irregularities resulting from the separation of the surface resistor material to make the current path, such that complete coverage of surface resistor and substrate is achieved. So-called pin-holes can then no longer occur. Since the melting point of the first layer is lower than that of the substrate, no change in the geometry of the substrate can result from the application of the layer.

To ensure that the low-melting first layer cannot be attacked, it is "sealed" by the outer layer so that a chemically resistant and hole-free total coverage is achieved.

To ensure that heat cannot flow over the surface resistor to the holding device, which would cause a "slow" temperature setting of the temperature-dependent surface resistor and lead to poorer measurement results, it is provided that the length L and the width B of the substrate are considerably greater than its thickness D, and that the relationship of the active surface ($F_w$) or the surface resistor to the edge area or areas ($F_R$) on the holding device side is $1/1 < F_w/F_R < 3/1$.

This measure ensures that the edge area or areas on the holding device side of the substrate are not substantially heated by the surface resistor, so that as a result no heat loss to the holding device can take place either. A stable temperature state of the temperature-dependent surface resistor is thus obtained almost inertia-free.

The dimensioning of non-heatable edge area or areas in relation to the active surface of the surface resistor permits an optimization to that effect that in spite of a "reduction" in the active surface, sufficiently large signals can be obtained for the required conclusions to be drawn about the flow speed or mass flow of the gases and fluids and about their temperatures.

An anemometer for measurement of the flow speed or mass flow of gases or fluids with a block-shaped substrate preferably consisting of glass material, having a leading edge and onto which a temperature-dependent surface resistor is deposited on which a cover layer is disposed in its turn, the surface resistor comprising an active surface with preferably meander-shaped current path and at least one adjacent edge area on the holding device side from which extend electrical supply and discharge leads, is characterized in that the relationship of the active surface $F_w$ of the surface resistor to the edge area or areas $F_R$ on the holding device side is $$1/1 < F_w/F_R < 3/1,$$

in that at least the active surface of the surface resistor is at a distance at least from the leading edge of the substrate, in that the cover layer extends to the substrate at least in the area of the active surface, and in that the cover layer consists of two layers, of which the (first) layer oriented towards the surface resistor or substrate has a melting point lower than that of the substrate.

Further details, advantages and features of the invention can be found not only in the claims and the features stated therein—singly and/or in combination, but also in the following description of a preferred embodiment as shown in the drawing.

Figure 2:
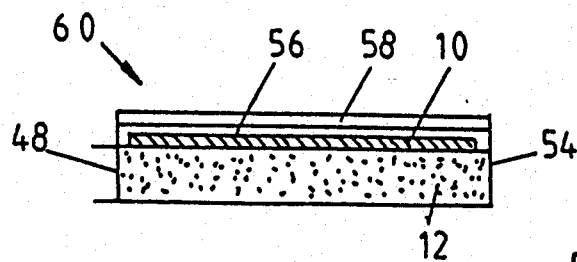

In the drawings,

FIG. 1 shows a plan view onto a resistor element with the cover layer left out, and FIG. 2 shows a section along the line II—II in FIG. 1.

FIG. 1 is a plan view of an anemometer. A temperature-dependent surface resistor (10) is deposited substantially over the entire area of a block-shaped substrate preferably of plate type and consisting of glass material. The material of the surface resistor (10) can be for example platinum and is applied to the large surface of the substrate (10) by sputtering or other known techniques. With etching techniques or separation by laser beams, for example, a meander-shaped current path (14) is imprinted through which current flows via connections (16) and (18) in order to achieve the required heating of the surface resistor (10) and hence of the substrate (12). The area in which the meander-shaped current path runs is the active surface of the surface resistor (10). The active surface runs between the dashed lines (32) and (34) and is generally stated as $F_w$.

On the outside, i.e. in the area of the transverse sides (28) and (30), the edge areas (20) and (22) on the holding device side are adjacent. The width of these edge areas (20) and (22) is relatively large in comparison with the width of the meander-shaped current path (14), so that heating in the edge areas (20), (22) as a result of the low resistance is negligible.

The edge areas (20) and (22) are generally designated as $F_R/2$, so that the overall surface of the edge areas (20) and (22) is $F_R$.

In this connection, it must be pointed out that the edge areas (20) and (22) naturally do not have to have the same surface areas. The overall surface is however designated as $F_R$ so that it can be compared with the active surface $F_w$ in the manner described below.

To achieve a almost inertia-free temperature setting, the substrate (12) is dimensioned with regard to its length L, width B and thickness D such that the thickness D is quite low in comparison with the length L and the width B. The thickness D is preferably 10 to 30 times lower than the width B, which in its turn can be 5 to 10 times smaller than the length L. It is of course possible to select the length and the width equal.

If a rectangular shape is selected, the length L can be 12 mm, for example, and the width B 2 mm with a thickness between 150 μm and 200 μm. Other dimensions are also possible, although as already mentioned it must be ensured that the thickness D is very low in comparison with the length L and the width B.

An optimization of the array is furthermore achieved when the relationship of the edge areas $F_R$ not heatable on the ends to the active surface $F_w$ of the surface resistor is:

$$1/1 < F_w/F_R < 3/1.$$

In a block-shaped substrate with a length L = 12 mm and a width B = 2 mm, the length of the active surface $F_w$, i.e. the distance between lines (32) and (34), can be 8 mm in the case of a heated temperature-dependent surface resistor, and 7 mm in the case of an unheated temperature-dependent resistor (the heated temperature-dependent resistor can have a resistance value of 9 Ohms in its active surface, the unheated temperature-dependent resistor a value of 1000 Ohms).

As FIG. 1 should make clear, the substrate (12) faces the flow from the left (arrows (42) and (44)) so that the fluid also impacts the left-hand longitudinal edge (48) of the substrate (12) that is to be designated as the leading edge. It is now provided in accordance with the invention that in the flow impact area the resistor material (10) is at a distance from the leading edge (48). This longitudinal edge of the resistor material has been given the reference number (50). Accordingly, a free area (46) is formed between the left-hand edge (50) of surface resistor (10) and the leading edge (48) of the substrate. A corresponding arrangement is preferably also provided on the side opposite the leading edge (48). Accordingly, the right-hand edge (52) of the surface resistor (10) is at a distance from the right-hand edge (54) of the substrate (12).

The width of the free area (46) on the leading edge side is in the order of magnitude of 0.05 mm to 0.15 mm.

To ensure that no dirt particles, moisture or similar can penetrate between the surface resistor (10) and the substrate (12), with the result that the resistance value of the active surface $F_w$ would alter in uncontrolled fashion, the surface resistor (10) is covered, in effect "sealed", at least in the area of the active surface $F_w$, but preferably beyond this (in FIG. 1 between lines (24) and (26)) by a cover layer (60) comprising a first layer (56) and a second layer (58) disposed thereon. The cover layer (60) extends here to the free substrate edge area, i.e. largely to the leading edge (48) or the opposite edge (54). This measure ensures that no dirt particles, moisture or similar can penetrate into the resistor material or between this material and the substrate (12).

The first layer (56) consists of a material with a melting point lower than that of the substrate (12). The material of the first layer (56) can be a glass substantially comprising lead oxide. The second layer (58), that can consist of silicon oxide ($SiO_x$), is disposed on the first layer, which is preferably deposited by screen printing.

The silicon oxide can be vapour-deposited. The outer layer (58) ensures that the inner layer (56) cannot be attacked, ruling out the formation of pinholes.

The first layer (56) can have a thickness of 10 μm±4 μm, and the outer layer (58) a thickness of 2 μm±1 μm.

What is claimed is:

1. An anemometer for measurement of the flow speed or mass flow of gases or fluids comprising a block-shaped substrate composed of glass material and having a leading edge, a temperature-dependent surface resistor partially covering said substrate, said substrate and at least a portion remaining covered by said surface resistor adjacent said leading edge, said surface resistor comprising a meander-shaped current path and being electrically connected with a source of current, at least a portion of said substrate remaining uncovererd by the surface resistor closest to the trailing edge of the substrate said anemometer having a covering layer on said surface resistor and in contact with said substrate, at least in the area adjacent said leading edge, said covering comprising a first cooling contacting said surface resistor and said substrate and a second coating contacting said first coating, the first coating having a melting point lower than the softening point of said substrate.

2. A resistor element as set fourth in claim 1 in which said surface resistor is entirely spaced apart from the leading edge of said substrate and said trailing edge of said substrate.

3. A resistor element useful for an anemometer for measurement of the flow speed or mass flow of gases or fluids comprising a block-shaped substrate composed of glass material and having a leading edge, a temperature-dependent surface resistor deposited onto and partially covering said substrate, leaving an area of said substrate not covered by said surface resistor adjacent said leading edge, said surface resistor comprising a meander-shaped current path and at least one adjacent area, and means connected with said adjacent area for supplying electric current, the relationship of the active surface $F_w$ of said surface resistor to said at least one adjacent area $F_R$ being $1/1 < F_w/F_R < 3/1$, said surface resistor leaving an area of said substrate uncovered between the edge of said surface resistor closest to the trailing edge of the substrate and said trailing edge, and said resistor element having a cover layer on said surface resistor and in contact with said substrate, at least in the area adjacent said leading edge, said cover layer comprising a first layer adjacent to said surface resistor and said substrate and a second layer covering said first layer, said first layer having a melting point lower than said substrate.

4. A resistor element as set forth in claim 1 or claim 3 in which said second layer has been vapor-deposited onto said first layer.

5. A resistor element as set forth in claim 1 or claim 3 in which said first layer has a thickness of about 10 μm ±4 μm.

6. A resistor element as set forth in claim 1 or claim 3 in which said second layer has a thickness of about 2 μm ±1 μm.

7. A resistor element as set forth in claim 1 or claim 3 in which said first layer has been deposited by screen printing.

8. A resistor element as set forth in claim 1 or claim 3 in which said second layer consists of silicon oxide.

* * * * *